(12) United States Patent
Rutherford et al.

(10) Patent No.: US 10,686,774 B2
(45) Date of Patent: Jun. 16, 2020

(54) AUTHENTICATION SYSTEMS AND METHODS FOR ONLINE SERVICES

(71) Applicant: ASIGNIO, INC., Sedro Woolley, WA (US)

(72) Inventors: Kyle Rutherford, Sedro Woolley, WA (US); Eric Dustrude, Bellingham, WA (US); Erik Hodge, Anderson Island, WA (US); Benjamin MacKay, Burlington, WA (US); Calvin Rutherford, Sedro Woolley, WA (US); Kevin Boyd, New Providence, NJ (US)

(73) Assignee: ASIGNIO INC., Sedro Woolley, WA (US)

( * ) Notice: Subject to any disclaimer, the term of this patent is extended or adjusted under 35 U.S.C. 154(b) by 8 days.

(21) Appl. No.: 15/872,910

(22) Filed: Jan. 16, 2018

(65) Prior Publication Data
US 2018/0205716 A1    Jul. 19, 2018

Related U.S. Application Data

(60) Provisional application No. 62/446,259, filed on Jan. 13, 2017, provisional application No. 62/575,325, filed on Oct. 20, 2017.

(51) Int. Cl.
*H04L 29/06* (2006.01)
*G06F 21/32* (2013.01)
(Continued)

(52) U.S. Cl.
CPC .............. *H04L 63/08* (2013.01); *G06F 21/31* (2013.01); *G06F 21/32* (2013.01); *H04L 9/3213* (2013.01);
(Continued)

(58) Field of Classification Search
CPC ...... H04L 63/08; H04L 9/3213; H04W 12/06; G06F 21/32; G06K 9/00154
(Continued)

(56) References Cited

U.S. PATENT DOCUMENTS

| 5,347,589 A | 9/1994 | Meeks et al. |
| 8,256,664 B1 | 9/2012 | Balfanz et al. |

(Continued)

FOREIGN PATENT DOCUMENTS

| WO | 2008043090 A1 | 4/2008 |
| WO | 2017087981 A3 | 8/2017 |
| WO | 2018132844 A1 | 7/2018 |

OTHER PUBLICATIONS

International Searching Authority, ISR & Written Opinion, PCT/US18/13916, dated Jun. 21, 2018, 8 pages.
(Continued)

*Primary Examiner* — Kambiz Zand
*Assistant Examiner* — Mohammad S Shams
(74) *Attorney, Agent, or Firm* — Michael R. Schacht; Schacht Law Office, Inc.

(57) ABSTRACT

An authentication system comprises a client device system associated with a session user, a data provider server system that stores user data, including user identification data, associated with the session user, a data provider interface system for displaying a data provider user interface on the client device system, an authentication server system that stores authentication data associated with the session user, and an authentication interface system for displaying an authentication user interface on the client device system.

2 Claims, 4 Drawing Sheets

(51) Int. Cl.
  *H04W 12/06* (2009.01)
  *H04L 9/32* (2006.01)
  *G06F 21/31* (2013.01)
  *G06K 9/00* (2006.01)

(52) U.S. Cl.
  CPC .......... *H04L 9/3234* (2013.01); *H04L 9/3247* (2013.01); *H04W 12/06* (2013.01); *G06K 9/00154* (2013.01); *H04L 2463/082* (2013.01)

(58) Field of Classification Search
  USPC ...................................................... 713/186
  See application file for complete search history.

(56) References Cited

U.S. PATENT DOCUMENTS

| | | | |
|---|---|---|---|
| 8,601,560 B2 | 12/2013 | Kim et al. | |
| 9,015,084 B2* | 4/2015 | Thieberger | G06Q 10/063 706/12 |
| 9,020,525 B2 | 4/2015 | Murphy et al. | |
| 9,071,616 B2* | 6/2015 | Lau | H04L 63/104 |
| 9,338,164 B1 | 5/2016 | Liu et al. | |
| 9,374,369 B2 | 6/2016 | Mahaffey et al. | |
| 9,641,520 B2 | 5/2017 | Neuman et al. | |
| 9,686,272 B2 | 6/2017 | Blinn | |
| 9,805,182 B1 | 10/2017 | Kayyidavazhiyil et al. | |
| 9,813,411 B2 | 11/2017 | Thibadeau et al. | |
| 9,836,741 B2 | 12/2017 | Varadarajan et al. | |
| 9,866,549 B2 | 1/2018 | Thibadeau et al. | |
| 9,887,975 B1* | 2/2018 | Gifford | H04W 12/10 |
| 9,887,999 B2 | 2/2018 | Dong et al. | |
| 9,980,146 B2* | 5/2018 | Raleigh | H04W 12/12 |
| 10,083,436 B1 | 9/2018 | Rutherford et al. | |
| 2003/0182585 A1 | 9/2003 | Murase et al. | |
| 2003/0233557 A1 | 12/2003 | Zimmerman | |
| 2005/0091500 A1* | 4/2005 | Okazaki | G06K 9/00154 713/176 |
| 2005/0144452 A1* | 6/2005 | Lynch | G06F 21/33 713/170 |
| 2009/0210939 A1 | 8/2009 | Xu et al. | |
| 2010/0008551 A9 | 1/2010 | Schiller et al. | |
| 2011/0047608 A1 | 2/2011 | Levenberg | |
| 2011/0061097 A1* | 3/2011 | Gregg | G06F 21/335 726/7 |
| 2011/0156867 A1 | 6/2011 | Carrizo et al. | |
| 2011/0258122 A1* | 10/2011 | Shader | G06Q 20/14 705/67 |
| 2011/0270751 A1 | 11/2011 | Csinger et al. | |
| 2012/0102551 A1 | 4/2012 | Bidare | |
| 2012/0180124 A1* | 7/2012 | Dallas | G06F 21/46 726/22 |
| 2012/0330769 A1 | 12/2012 | Arceo | |
| 2013/0145446 A1 | 6/2013 | Dorso et al. | |
| 2013/0148024 A1 | 6/2013 | Shin et al. | |
| 2014/0007205 A1 | 1/2014 | Oikonomou | |
| 2014/0282961 A1 | 9/2014 | Dorfman et al. | |
| 2014/0375573 A1 | 12/2014 | Idzik et al. | |
| 2015/0019443 A1* | 1/2015 | Sheets | G06Q 20/3278 705/71 |
| 2015/0046276 A1 | 2/2015 | Artman et al. | |
| 2015/0071505 A1 | 3/2015 | Kim et al. | |
| 2015/0237031 A1 | 8/2015 | Neuman et al. | |
| 2015/0312252 A1 | 10/2015 | Potonniee | |
| 2015/0334108 A1 | 11/2015 | Khalil et al. | |
| 2016/0027009 A1* | 1/2016 | Sivashanmugam | H04L 63/083 705/21 |
| 2016/0057135 A1 | 2/2016 | Jiang et al. | |
| 2016/0191506 A1 | 6/2016 | Wang | |
| 2016/0259895 A1 | 9/2016 | Austermann et al. | |
| 2016/0314462 A1 | 10/2016 | Hong et al. | |
| 2016/0337351 A1 | 11/2016 | Spencer et al. | |
| 2017/0060812 A1 | 3/2017 | Williams et al. | |
| 2017/0149803 A1* | 5/2017 | Lo | H04L 63/1416 |
| 2019/0066092 A1 | 2/2019 | Rutherford et al. | |

OTHER PUBLICATIONS

USPTO, "Non-Final Office Action, U.S. Appl. No. 15/358,052," dated Jul. 5, 2018, 13 pages.

International Searching Authority, ISR & Written Opinion, PCT/US2016/063196, dated May 18, 2017, 7 pages.

USPTO, "Final Office Action, U.S. Appl. No. 14/501,554," dated Jun. 21, 2017, 16 pages.

USPTO, "Non-Final Office Action, U.S. Appl. No. 14/501,554," dated Jan. 16, 2018, 12 pages.

Zoltan Puskas, Some Stuff, Android Unlock Pattern Security Analysis, https://sinustrom.info/2012/05/21/android-unlock-pattern-security-analysis/, May 21, 2012, 3 pages.

International Searching Authority, ISR & Written Opinion, PCT/US2018/056936, dated Jan. 31, 2019, 8 pages.

USPTO, "Final Office Action, U.S. Appl. No. 15/358,052", dated Dec. 11, 2018, 14 pages.

* cited by examiner

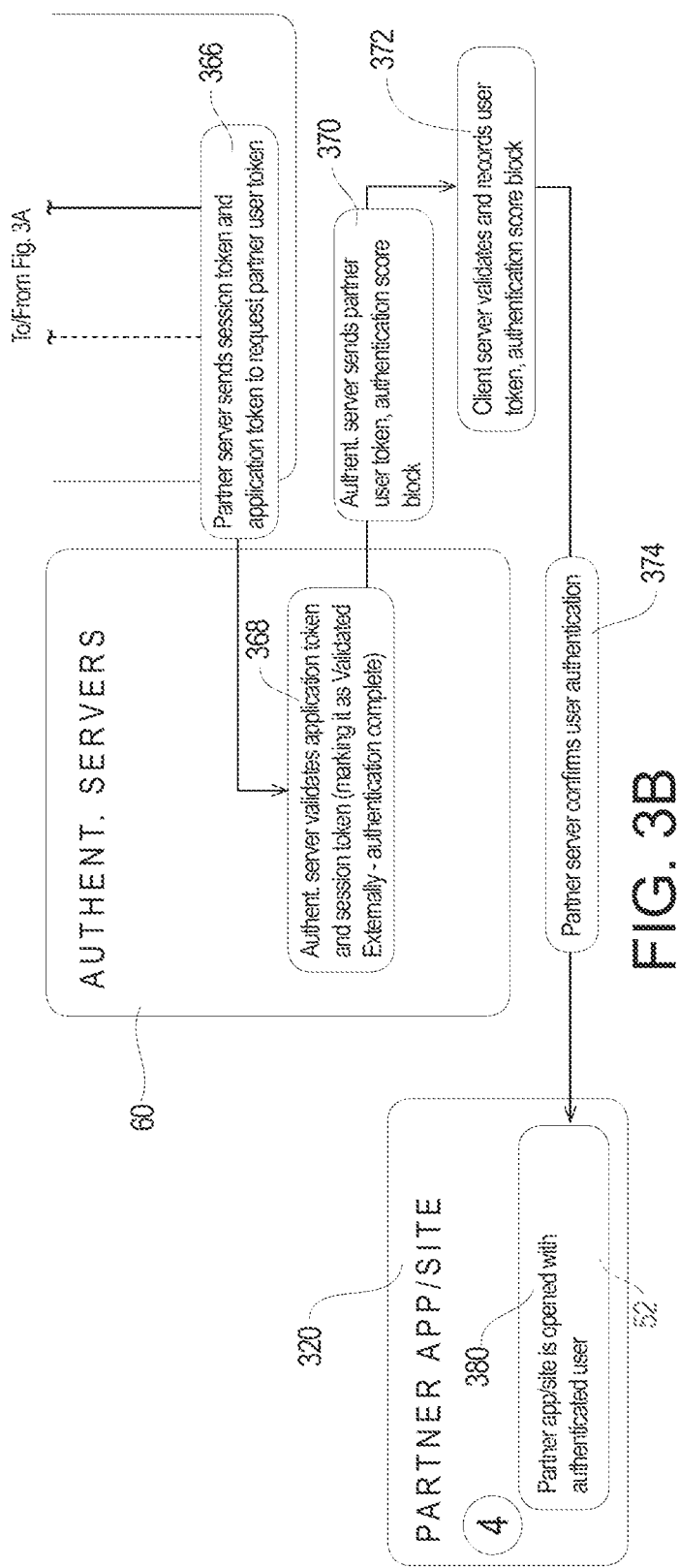

AUTHENTICATION SYSTEMS AND METHODS FOR ONLINE SERVICES

RELATED APPLICATIONS

This application, U.S. patent application Ser. No. 15/872,910 filed Jan. 16, 2018 claims priority of U.S. Provisional Application Ser. No. 62/446,259, filed on Jan. 13, 2017, now expired.

This application also claims priority of U.S. Provisional Application Ser. No. 62/575,325, filed on Oct. 20, 2017.

The contents of all applications listed above are incorporated herein by reference.

TECHNICAL FIELD

The present invention relates to systems and methods for authenticating the identity of users accessing a computer system and, more particularly, to authentication systems and methods for accessing online services that provide multiple identity verifications prior to allowing such access.

SUMMARY

The present invention may be embodied as authentication system comprising a client device system associated with a session user, a data provider server system that stores user data, including user identification data, associated with the session user, a data provider interface system for displaying a data provider user interface on the client device system, an authentication server system that stores authentication data associated with the session user, and an authentication interface system for displaying an authentication user interface on the client device system. The data provider interface system allows the session user to initiate an authentication session. In response to initiation of the authentication session, the authentication server system generates an authentication session token marked in process and passes the authentication token and the user identification data associated with the session user to the authentication interface system. The authentication interface system displays the user identification data and allows the session user to confirm that the user identification data is accurate. Based on the user identification data, the authentication server system validates that the authentication server system contains authentication data associated with the session user and instructs the authentication interface system to display a signature screen element to the session user, allow the session user to enter a session signature on the signature screen, generate signature data associated with the session signature, and send the signature data and authentication session token to the authentication server system. Upon receipt of the signature data, the authentication server system validates the session signature based on a comparison of the signature data with the authentication data associated with the session user that is stored by the authentication server system and marks the authentication session token as validated internally. Based on validation of the session signature and the authentication session token, the data provider interface system sends the authentication token to the data provider data server system. Upon receipt of the authentication token from the data provider interface system, the data provider data server system validates the authentication session token. Upon validation of the authentication session token by the data provider data server system, the authentication server marks the application token session as validated externally. Upon marking of the application token session as validated externally, the authentication server system sends a partner user token and an authentication score block to the data provider server system. Upon receipt of the partner user token and the authentication score block by the data provider server system, the data provider server system instructs the data provider user interface system to display to the session user data associated with the session user.

The present invention may also be embodied as a method comprising the following steps. A client device system is associated with a session user. User data, including user identification data, associated with the session user is stored in a data provider server system. A data provider interface system for displaying a data provider user interface on the client device system is provided. Authentication data associated with the session user is stored in an authentication server system. An authentication interface system for displaying an authentication user interface on the client device system is provided. The data provider interface system is caused to allow the session user to initiate an authentication session. In response to initiation of the authentication session, the authentication server system is caused to generate an authentication session token marked in process and passes the authentication token and the user identification data associated with the session user to the authentication interface system. The authentication interface system is caused to display the user identification data to the session user. The session user is allowed to confirm that the user identification data is accurate. The authentication server system is caused to validate that the authentication server system contains authentication data associated with the session user based on the user identification data. The authentication interface system is instructed to display a signature screen element to the session user, allow the session user to enter a session signature on the signature screen, generate signature data associated with the session signature, and send the signature data and authentication session token to the authentication server system. Upon receipt of the signature data, the authentication server system is caused to validate the session signature based on a comparison of the signature data with the authentication data associated with the session user that is stored by the authentication server system and to mark the authentication session token as validated internally. Based on validation of the session signature and the authentication session token, the data provider interface system is caused to send the authentication token to the data provider data server system. Upon receipt of the authentication token from the data provider interface system, the data provider data server system is caused to validate the authentication session token. Upon validation of the authentication session token by the data provider data server system, the authentication server is caused to mark the application token session as validated externally. Upon marking of the application token session as validated externally, the authentication server system is caused to send a partner user token and an authentication score block to the data provider server system. Upon receipt of the partner user token and the authentication score block by the data provider server system, the data provider server system is caused to instruct the data provider user interface system to display to the session user data associated with the session user.

BRIEF DESCRIPTION OF THE DRAWINGS

FIGS. 3A and 3B depict portions of a schematic logic flow diagram depicting an example of the first example authentication method.

DETAILED DESCRIPTION

Figure 1:
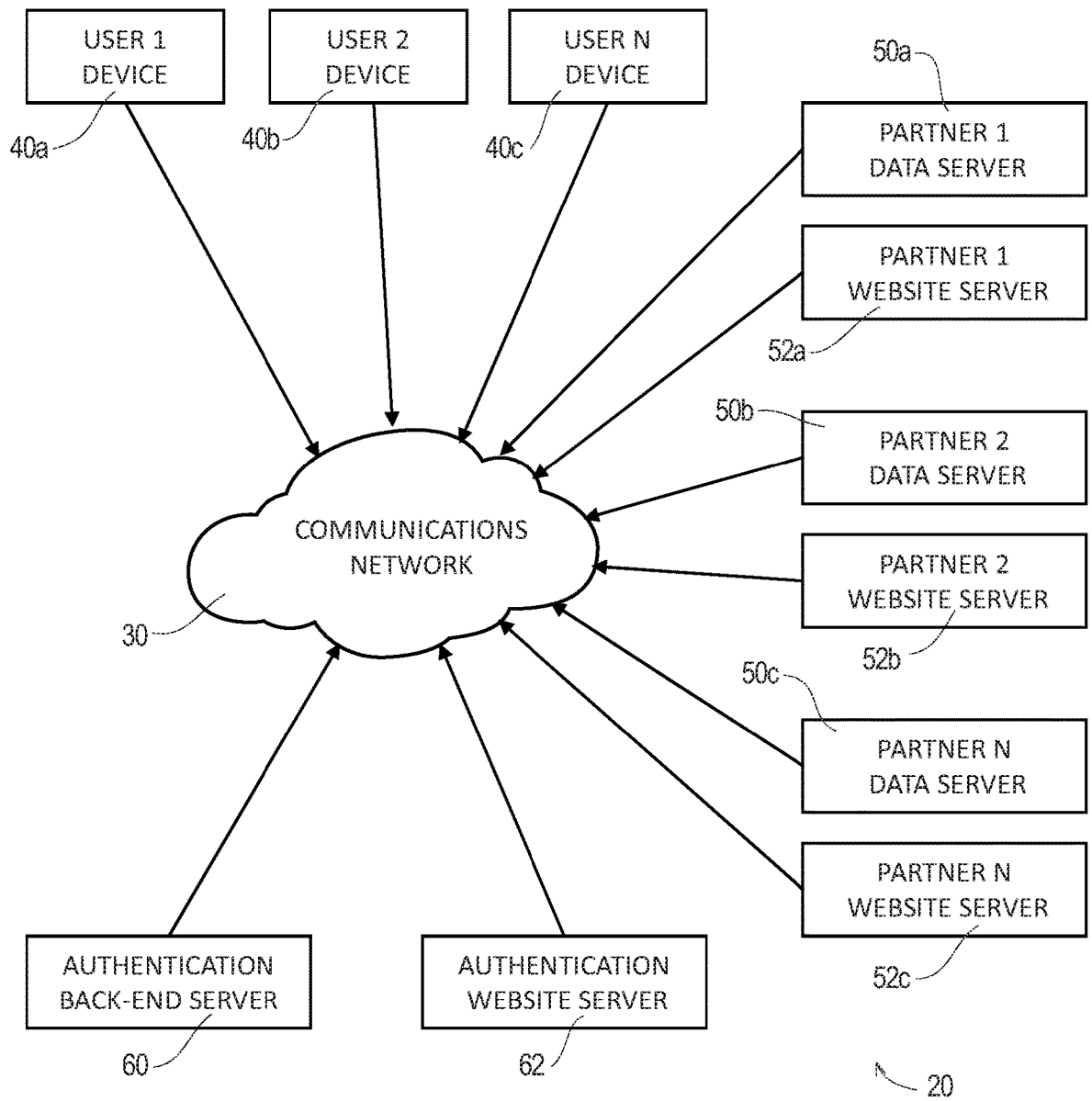
FIG. 1 is a schematic block diagram of an online service system configured to implement a first example authentication system and a first example authentication method according to one example of the present invention.

Referring initially to FIG. 1 of the drawing, depicted therein is an example computer system 20 on which the authentication systems and methods of the present invention may be implemented. In particular, FIG. 1 illustrates that the example computer system 20 comprises a communications system 30 that allows data to be exchanged among a plurality of user device systems 40a, 40b, and 40c, a plurality of data provider data server systems 50a, 50b, and 52c, a plurality of data provider app/website systems 52a, 52b, and 52c, at least one authentication back-end server system 60, and at least one authentication app/website system 62. The use of the suffixes a, b, and n in conjunction with reference characters herein indicates that the number of the elements identified by a particular element can be as few as one to and, theoretically, may be unlimited.

The user device systems 40a, 40b, and 40c are typically operated by one or more users as will be described in further detail below. The data provider data server systems 50a, 50b, and 50c and data provider app/website systems 52a, 52b, and 52c are typically operated by data provider entities, sometimes referred to herein as partners, that store user data associated with at least one user of the user device systems 40a, 40b, and 40c. The authentication server system 60 and authentication app/website system 62 are typically operated by an authentication provider. The authentication provider is typically an entity separate from the data provider entities, but a data provider entity could operate the authentication server system 60 and/or the authentication app/website system 62. Typically, one authentication provider will provide authentication services to multiple users and multiple data providers as shown in FIG. 1, but the principles of the present invention may also be applied to the simplified case of a single user and single data provider entity. In the common instance where one user is accessing data stored by one data provider as described below, the reference characters 40, 50, and 52 may be used without suffix for simplicity. The example computer system 20 is thus configured to allow multiple authenticated users of the user device systems 40a, 40b, and 40c to access user data stored on the data provider data server systems 50a, 50b, and 50c.

The example communications system 30 is any communications system capable of facilitating the transfer of data among computing devices connected thereto. The example communications system 30 may take the form of a distributed communications system such as the Internet™.

The example user device systems 40a, 40b, and 40c comprise computer hardware and an associated operating system software capable of accepting input in the form of signature data as will be described in further detail below. The example user device systems 40a, 40b, and 40c are further capable of running software such as a browser software and/or specialized apps as will also be described in further detail below. As is conventional, the example user device systems 40a, 40b, and 40c are also capable of communicating with other communicating devices through the example communications system 30. The example user devices 40a, 40b, and 40c are formed by conventional devices such as smartphones, tablet computers, or workstations having a touchscreen and integrated wired or wireless communications capabilities.

The example data provider data servers 50a, 50b, and 50c are computing systems capable of storing the user data associated with the one or more users operating user device systems 40a, 40b, and 40c and performing certain logic and data processing functions as will be described in further detail below. The example data provider app/website systems 52a, 52b, and 52c may be formed by either a website server that exposes one or more websites to users operating a browser on the user devices 40a, 40b, and 40c or a specialized app running on the user device systems 40a, 40b, and 40c. As will be described herein in further detail, the data provider app/website systems 52a, 52b, and 52c, allow authenticated users to access data stored on the data provider data server systems 50a, 50b, and 50c, respectively. The data server systems 50a, 50b, and 50c and website servers forming the data provider app/website systems 52a, 52b, and 52c may run on hardware servers owned and operated by the data provider entity associated therewith but are typically virtualized server systems operated by a third party.

The example authentication back-end server system 60 is a computing system capable of storing the user data associated with the one or more users operating user device systems 40a, 40b, and 40c and performing certain logic and data processing functions as will be described in further detail below. The example authentication app/website system 62 is either a dedicated app capable of running on the user device systems 40a, 40b, and 40c or a computing system that exposes one or more websites to users operating a browser or specialized app running on the user device systems 40a, 40b, and 40c. The authentication back-end server system 60 and authentication app/website system 62 may run on hardware servers owned and operated by the authentication entity associated therewith but are typically virtualized server systems operated by a third party.

At least some of the data stored on the data provider data servers 50a, 50b, and 50c may be confidential and should be accessed only by individuals having proper authorization. Such individuals may include one or more of the users operating the user device systems 40a, 40b, and 40c and/or employees of the data provider entities. To ensure that individuals that access the data provider data servers 50a, 50b, and 50c are authorized to access the data stored thereon, the computer system 20 is configured to authenticate the identity of the users operating the user device systems 30a, 30b, and 30n before allowing access to data stored on the data provider data server systems 50a, 50b, and 50c.

Referring now to FIGS. 2A, 2B, 2C, and 2D, example user interfaces displayed by the user device 30 when performing the first example authentication method will now be described. The example depicted in FIGS. 2A-2D assumes that the user of the user device 30 has a Data provider User Account with the data provider entity associated with the data provider data server system 50 and the data provider app/website system 52 and also an Authentication User Account with the authentication entity associated with the authentication back-end server system 60 and the authentication app/website system 62. Further, each data provider entity will typically have an existing association with the authentication entity that allows website linking and access to enough information to associate data in the Authentication User Account with data in the data provider User Account. The data provider entity has the primary relationship with the users and responsibility for the user's data, so the data provider entity will typically be in primary control of the first example authorization method.

Figures 2A, 2B, 2C, 2D:
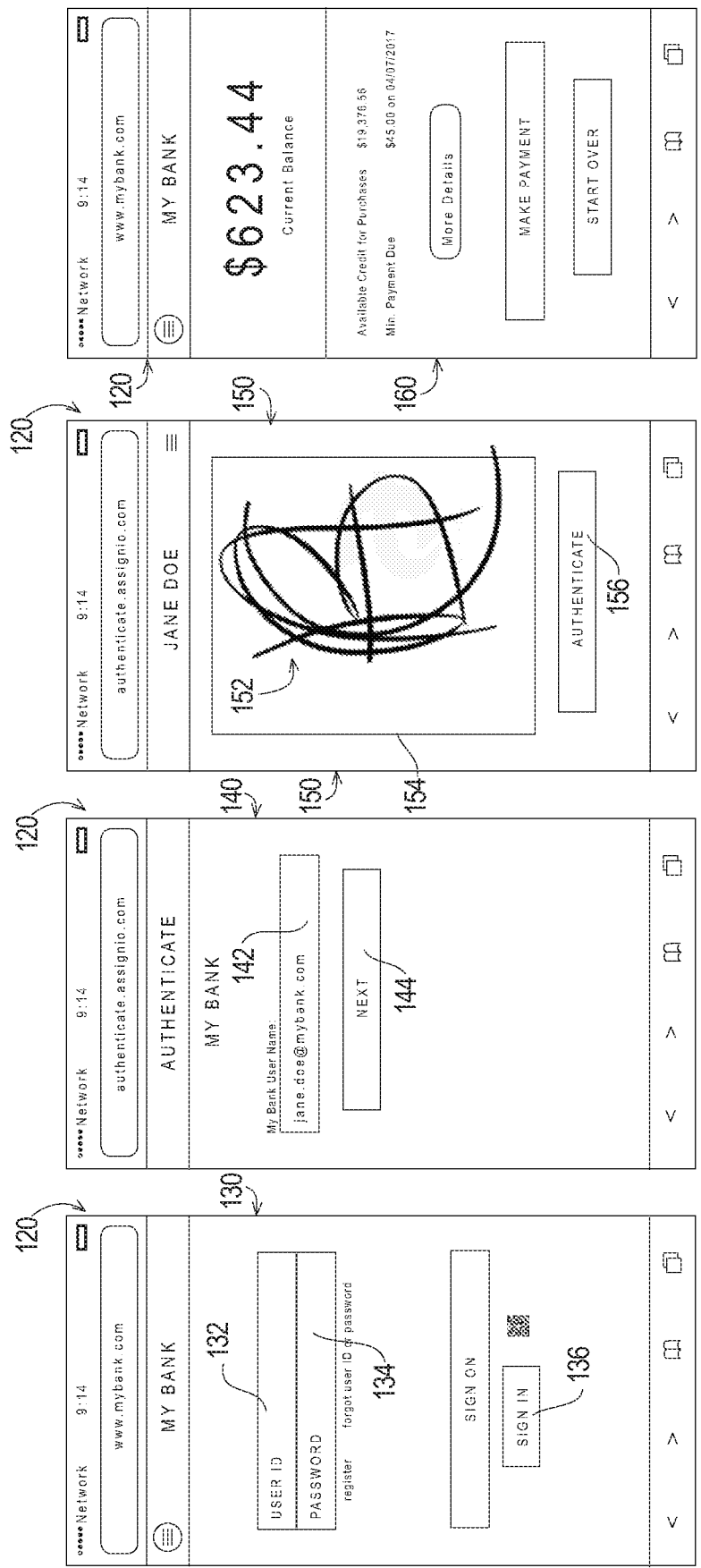
FIG. 2A depicts an example primary authentication user interface that may be displayed to initiate the first example authentication method.
FIG. 2B depicts an example secondary authentication initiation user interface that may be displayed to initiate the first example authentication method.
FIG. 2C depicts an example secondary authentication user interface that may be displayed to complete the first example authentication method.
FIG. 2D depicts an example access user interface that may be displayed after completion of the first example authentication method.

FIG. 2A illustrates that the example user device 30 comprises a touch screen 120 for allowing the user to read and enter data. The example data provider app/website system 52 is configured to display a user interface 130 on the example touch screen 120 of the user device 30. The user interface 130 comprises first and second primary authentication data fields 132 and 134 and a secondary authentication Sign In button 136. The first primary authentication data field 132 allows the user to enter a User ID, while the second primary authentication data field 134 allows the user to enter a User Password. The data provider data server system 50 stores combinations of User ID's and User Passwords, where each combination is associated with a data provider User Account. Each User Account includes or allows access to the user data associated with that User Account.

The data provider data server system 50 and/or data provider app/website system 50 will perform a primary authentication of the user's identity by comparing the entered User ID and the User Password with the list of stored combinations of User ID's and User Passwords in a conventional manner. If entered User ID and User Password match a stored User ID and User Password associated with a known User Account, the primary authentication process is successfully completed.

Before allowing the user of the user device system 20 to access the data associated with the User Account associated with the entered User ID and associated User Password, however, the example computer system 20 can be configured to require a secondary authentication step. One example of a secondary authentication step can be a conventional one time code sent to a device associated with the user of the user device system 30. However, the example Sign In button 136 displayed by the example user interface 130 allows the user to elect to perform, in addition or instead, a more secure secondary authentication step as depicted in FIGS. 2B and 2C.

In particular, selecting the example Sign In button 136 controls the touchscreen 120 of the user device 20 such that the user interface 130 is no longer displayed by the data provider app/website system 52 on the touch screen 120; instead, the touchscreen 120 of the user device 20 displays a user interface 140 generated by the authentication website server 62 on the touch screen 120 as depicted in FIG. 2B. The example user interface 140 comprises a data display field 142 and a Next button 144. The example data display field 142 displays User Identification data for the User Account associated with the entered User ID and associated User Password.

Selecting the Next button 144 on the user interface 140 is replaced with an authentication user interface 150 generated by the authentication website server 62 that allows the user to enter a User Signature 152 within a drawing area 154 of the touchscreen 120. When the User Signature 152 is complete, the user selects an Authenticate button 156, and the authentication data server system 60 compares data representative of the User Signature 152 with data representative of the stored User Signature. If the data associated with the Session User Signature 152 substantially matches data associated with the stored User Signature, the user is authenticated. The process of substantially matching data associated with the Session User Signature 152 with data associated with the stored User Signature is described, for example, in U.S. patent application Ser. No. 14/501,554 and U.S. Patent Application Publication Number 2017/0149757, which are incorporated herein by reference.

Once the user has been also authenticated by the authentication data server system 60, the data provider data server system 50 causes the touchscreen 120 of the user device 30 to display a data report user interface 160 displaying at least a portion of the user data associated with the Data provider User Account.

Figure 3A:
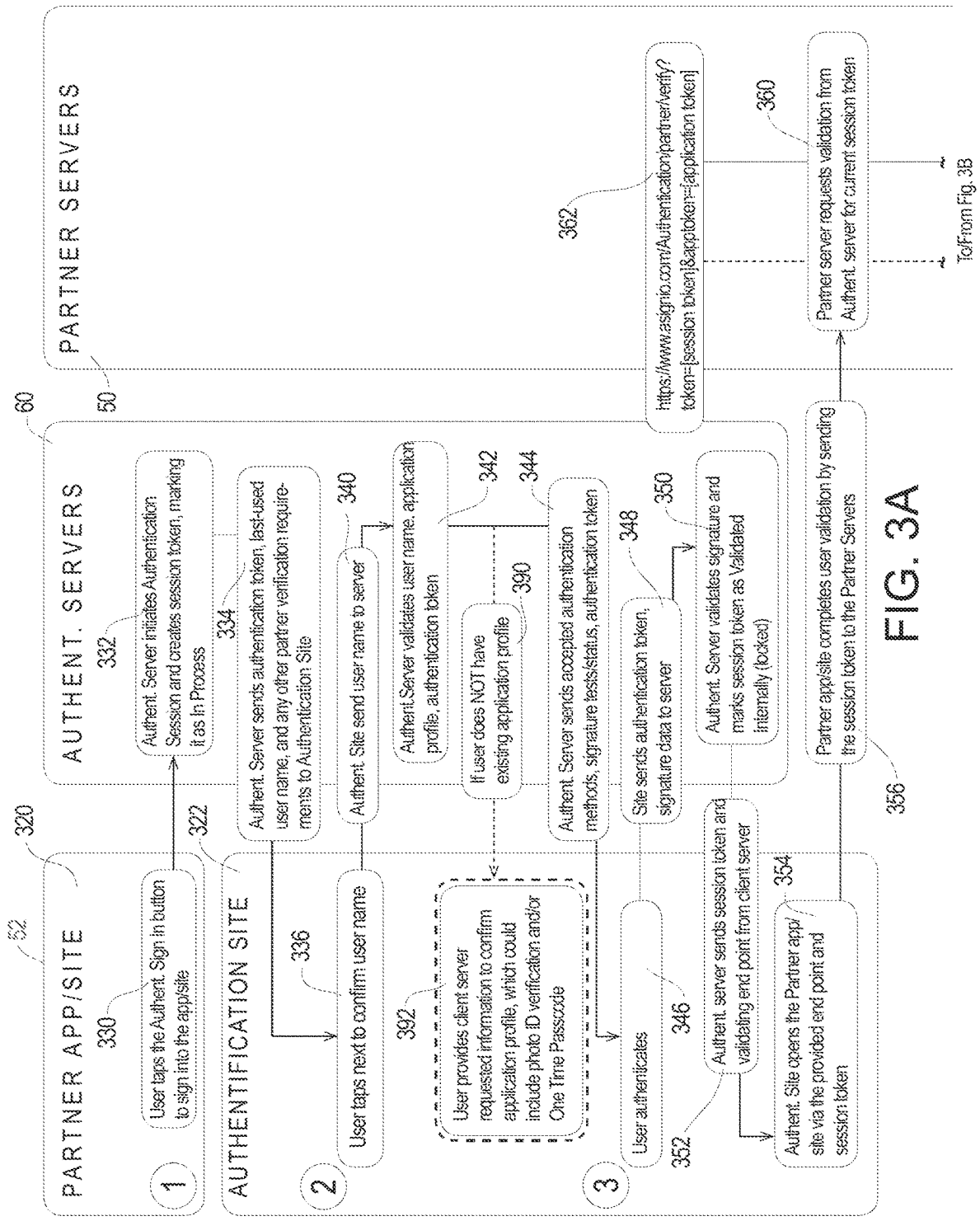

Turning now to FIGS. 3A and 3B of the drawing, another example of the secondary authentication process implemented by first example authentication method of the present invention will now be described. FIGS. 3A and 3B illustrate that, using the first example authentication method depicted therein, certain steps are performed using a user interface 320 displayed on the user device system 30 by the data provider app/website system 52, certain steps are performed using a user interface 322 displayed on the user device system 40 by the authentication website system 62, certain steps are performed by the data provider data server system 50, and certain steps are performed by the authentication data server system 60. Other steps may be performed by any of the various systems 40, 50, 52, 54, and 56 and are not specifically associated with the any of these systems 40, 50, 52, 60, or 62.

In particular, the connection between the authentication server system 60 and data provider data server system(s) 50 is established via configuration. In particular, the authentication server systems 60 issue company and application tokens that are stored on both servers. These tokens can be updated periodically. The example authentication servers 60 use AWS Key Management Systems to store/manage the private keys and ensure encryption.

The data provider data server system 50 provides authentication with an endpoint that the data provider data server system 50 uses to validate the authentication, thus allowing the data provider entity to maintain final control over both steps of the authentication process.

The User Account of each authentication user has an application profile for the data provider applications to which they have permissions. The data provider data server system 50 generates a user token that is then stored as part of the authentication application profile and is what connects the authentication user's profile to a particular data provider application user.

The secondary authentication process begins at step 330 when the user taps an Authenticate Signature button displayed by the data provider app/website user interface 320 on the user device system 40. At step 332, the authentication server system 60 next initiates an authentication session and creates an authentication session token, marking the session token as in process.

At step 334, the authentication server 60 sends the authentication session token and other data such as the last-used user name and any other data provider verification requirements to the authentication app/website system 62. Based on the data provider verification requirements, the user interface 322 displays the user name and/or other data to the user, and the user confirms the user name at step 336. The authentication app/website system 62 then sends the user name to the authentication server 60 at step 340. The authentication server 60 validates the user name, application profile, and authentication session token at step 342.

At step 344, the authentication server 60 sends any accepted authentication method(s), signature tests/status, and the authentication session token back to the authentication app/website system 62. In particular, the authentication method(s) may vary by data provider, and the signature tests/status may vary with different version over time. Step 344 ensures that the authentication app/website system 62 obtains authorization at step 346 using the correct authentication method(s) and up-to-date signature tests/status.

After the user enters an authentication signature at step 346, the authentication app/website system 62 sends the authentication session token and data representative of the session signature back to the authentication server 60 at step 348. At step 350, the authentication server system 60 validates the signature by comparing the data representative of the session signature with data representative of at least one previously stored signature or composite signature as described, for example, in U.S. patent application Ser. No. 14/501,554 and U.S. Patent Application Publication Number 2017/0149757, which are incorporated herein by reference. If the session signature matches the previously stored signature(s) or composite signature, the authentication session token in marked as validated internally (e.g., locked).

At this point, the authentication server system 60 sends the authentication session token, now marked as validated internally, back to the authentication app/website system 62 along with the endpoint provided by the data provider data server system 50. The authentication app/website system 62 opens the data provider app/website system 52 using the provided endpoint and the authentication session token. At step 356, the data provider app/website system 52 completes the user validation by sending the authentication session token to the data provider data server system 50 at step 356. The data provider data server system 50 next requests validation from the authentication server 60 at steps 360 and 362. At step 366, the data provider data server system 50 sends the authentication session token and application token to the authentication server system 60 to request a data provider user token. At step 368, the authentication server system 60 validates the application token and authentication session token and marks it as validated externally.

The secondary authentication process is now complete, and, at step 370, the authentication server system 60 sends a data provider user token and authentication score block back to the data provider data server system 50. The data provider data server system 50 validates and records the user token and authentication score block at step 372, and the data provider data server system 50 sends confirmation of user authentication back to the data provider app/website system 52 at step 374. At step 380, the data provider app/website system 52 opens to allow the user to access the user data stored in the data provider data server system 50.

Optional steps 390 and 392 may be performed to allow the user to create an account on the authentication server system 60 if the user does not yet have an authentication account.

What is claimed is:

1. An authentication system comprising:
   a client device system associated with a session user;
   a data provider data server system that stores user data, including user identification data, associated with the session user;
   a data provider interface system for displaying a data provider user interface on the client device system;
   an authentication server system that stores authentication data associated with the session user;
   an authentication interface system for displaying an authentication user interface on the client device system; whereby
   the data provider interface system allows the session user to initiate an authentication session;
   in response to initiation of the authentication session, the authentication server system generates an authentication session token marked in process and passes the authentication session token and the user identification data associated with the session user to the authentication interface system;
   the authentication interface system displays the user identification data and allows the session user to confirm that the user identification data is accurate;
   based on the user identification data, the authentication server system validates that the authentication server system contains authentication data associated with the session user and instructs the authentication interface system to
      display a signature screen element to the session user,
      allow the session user to enter a session signature on the signature screen,
      generate signature data associated with the session signature, and
      send the signature data and authentication session token to the authentication server system;
   upon receipt of the signature data, the authentication server system
      validates the session signature based on a comparison of the signature data with the authentication data associated with the session user that is stored by the authentication server system, and
      if the session signature is validated, marks the authentication session token as validated internally;
   based on validation of the session signature and the authentication session token, the data provider interface system sends the authentication session token to the data provider data server system;
   upon receipt of the authentication session token from the data provider interface system, the data provider data server system validates the authentication session token;
   after the authentication session token has been validated by the data provider data server system, the data provider data server system sends the authentication session token back to the authentication server;
   after the authentication server receives the authentication session token back from the data provider data server system, the authentication server marks the authentication session token as validated externally;
   after the authentication server has marked the authentication session token as validated externally, the authentication server system sends a partner user token and an authentication score block to the data provider server system; and
   upon receipt of the partner user token and the authentication score block by the data provider server system, the data provider server system determines whether to instruct the data provider user interface system to display the data associated with the session user to the session user.

2. A method comprising the steps of:
   providing a client device system, where the client device system is associated with a session user;
   storing user data, including user identification data, associated with the session user in a data provider data server system;

providing a data provider interface system for displaying a data provider user interface on the client device system;
storing in an authentication server system authentication data associated with the session user;
providing an authentication interface system for displaying an authentication user interface on the client device system;
causing the data provider interface system to allow the session user to initiate an authentication session;
in response to initiation of the authentication session, causing the authentication server system to generate an authentication session token marked in process and passes the authentication session token and the user identification data associated with the session user to the authentication interface system;
causing the authentication interface system to display the user identification data to the session user;
allowing the session user to confirm that the user identification data is accurate;
causing the authentication server system to validate that the authentication server system contains authentication data associated with the session user based on the user identification data;
instructing the authentication interface system to
 display a signature screen element to the session user,
 allow the session user to enter a session signature on the signature screen,
 generate signature data associated with the session signature, and
 send the signature data and authentication session token to the authentication server system;
upon receipt of the signature data, causing the authentication server system
 to validate the session signature based on a comparison of the signature data with the authentication data associated with the session user that is stored by the authentication server system, and
 if the session signature is validated, to mark the authentication session token as validated internally;
based on validation of the session signature and the authentication session token, causing the data provider interface system to send the authentication session token to the data provider data server system;
upon receipt of the authentication session token from the data provider interface system, causing the data provider data server system to validate the authentication session token;
after the authentication session token has been validated by the data provider data server system, causing the data provider data server system to send the validated authentication session token back to the authentication server;
after the authentication server receives the validated authentication session token back from the data provider data server system, causing the authentication server to mark the application token session as validated externally;
after the authentication server has marked the authentication session token as validated externally, causing the authentication server system to send a partner user token and an authentication score block to the data provider server system; and
upon receipt of the partner user token and the authentication score block by the data provider server system, causing the data provider server system to determine whether to instruct the data provider user interface system to display the data associated with the session user to the session user.

* * * * *